United States Patent [19]

Marcus et al.

[11] 4,447,149

[45] May 8, 1984

[54] PULSED LASER RADAR APPARATUS

[75] Inventors: Stephen Marcus, Lexington; Theodore M. Quist, W. Acton, both of Mass.

[73] Assignee: The United States of America as represented by the Secretary of the Air Force, Washington, D.C.

[21] Appl. No.: 274,698

[22] Filed: Jun. 17, 1981

[51] Int. Cl.³ .......................... G01C 3/08; G01P 3/36
[52] U.S. Cl. ......................................... 356/5; 356/28.5
[58] Field of Search .................................. 356/5, 28.5

[56] References Cited

U.S. PATENT DOCUMENTS

| 3,511,569 | 5/1970 | Mackta | 356/28.5 |
| 3,856,402 | 12/1974 | Low et al. | 356/28.5 |
| 4,298,280 | 11/1981 | Harney | 356/5 |

Primary Examiner—S. C. Buczinski
Attorney, Agent, or Firm—Donald J. Singer; William Stepanishen

[57] ABSTRACT

A pulsed laser radar apparatus utilizing a Q-switched laser unit to generate laser pulse signals including a low intensity trailing tail. The trailing tail is utilized to provide a local oscillator signal that is combined with the target return signal prior to detection in a heterodyned detector unit.

5 Claims, 5 Drawing Figures a) PULSED — CW WAVEFORM
b) Q-SWITCH VOLTAGE REQUIRED TO PRODUCE THE WAVEFORM OF FIG. 2a

PULSED LASER RADAR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a laser radar apparatus, and in particular to a pulsed radar apparatus utilizing laser operation.

With the development of laser devices providing good frequency stability, optical systems for Doppler homodyne detection have become possible. In a typical laser Doppler system, the laser beam is expanded in diameter and is directed at a target. The radiation back reflected and scattered by the target is received by receiver optics and directed to a detector. A portion of the laser beam is split off prior to transmission and forms the local oscillator beam. This local oscillator beam is also directed to the detector to produce Doppler signal.

One form of laser Doppler system is a co-linear off-axis system. In this system, the laser beam is split by a beam splitter into the output and local oscillator beams. The output beam is directed to an off-axis Cassegrain telescope which provides beam expansion. The returning beam is reduced by the same Cassegrain telescope and is directed to a detector. The local oscillator beam is combined with the returning beam by means of a beam splitter. A disadvantage of the co-linear transmitter-receiver system is the inherent 6 db signal loss. This signal loss is due to the 50% beam splitter which is shared by the output and returning beams.

On-axis systems (systems in which the beam expander optics are located on-axis rather than off-axis) have additional disadvantages. These on-axis systems, which typically use a Cassegrain telescope, can reflect a large amount of laser energy under variable phase and frequency back into the laser and thus broaden the frequency spectrum of the laser. The performance of the system, therefore, is degraded.

One system which overcomes the 6 db signal loss problem uses a plane mirror having a hole through it. Both sides of the plane mirror are reflecting surfaces. The laser beam is expanded by beam expanding optics and the expanded beam is directed to the plane mirror, which is oriented at 45° to the direction of propagation of the expanded beam. Most of the beam is reflected by the first surface of the mirror and is directed at a cube corner reflector. The cube corner reflector reflects the beam to the target. A small portion of the beam, however, passes through the hole to become the local oscillator beam. The returning beam from the target is reflected off the second surface of the mirror and directed along a common path with the local oscillator beam. The returning beam and the local oscillator beam pass through beam reducing lenses which focus the returning beam and the local oscillator beam on to the detector.

The disadvantages of this system are that it requires on-axis beam expanding optics. The on-axis arrangement results in back reflection which can degrade laser performance. In addition, the system uses several lenses to expand the output beam and to reduce te returning beam. When an infrared laser such as a $CO_2$ laser is used, these lenses can be very expensive.

SUMMARY OF THE INVENTION

The present invention utilizes a single Q-switched laser to generate both a target signal and a local oscillator signal for use in a heterodyne signal detector. After the laser pulse is generated, the laser unit is maintained at a very low signal output level for substantially the majority of the time before the generation of the next laser pulse. During the time the laser is operated at a very low signal output level, the output of the laser is utilized as a local oscillator and is mixed with the returning target signal prior to application to the detector unit.

It is one object of the present invention, therefore, to provide an improved pulsed laser radar apparatus.

It is another object of the invention to provide an improved pulsed laser radar apparatus utilizing a single Q-switched laser for heterodyne signal detection.

It is another object of the invention to provide an improved pulsed laser radar apparatus wherein frequency jitter must be kept within limits only for the round trip transit time of the output pulse.

It is still another object of the invention to provide an improved pulsed laser radar apparatus wherein range information is more readily available over a continuous wave radar.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
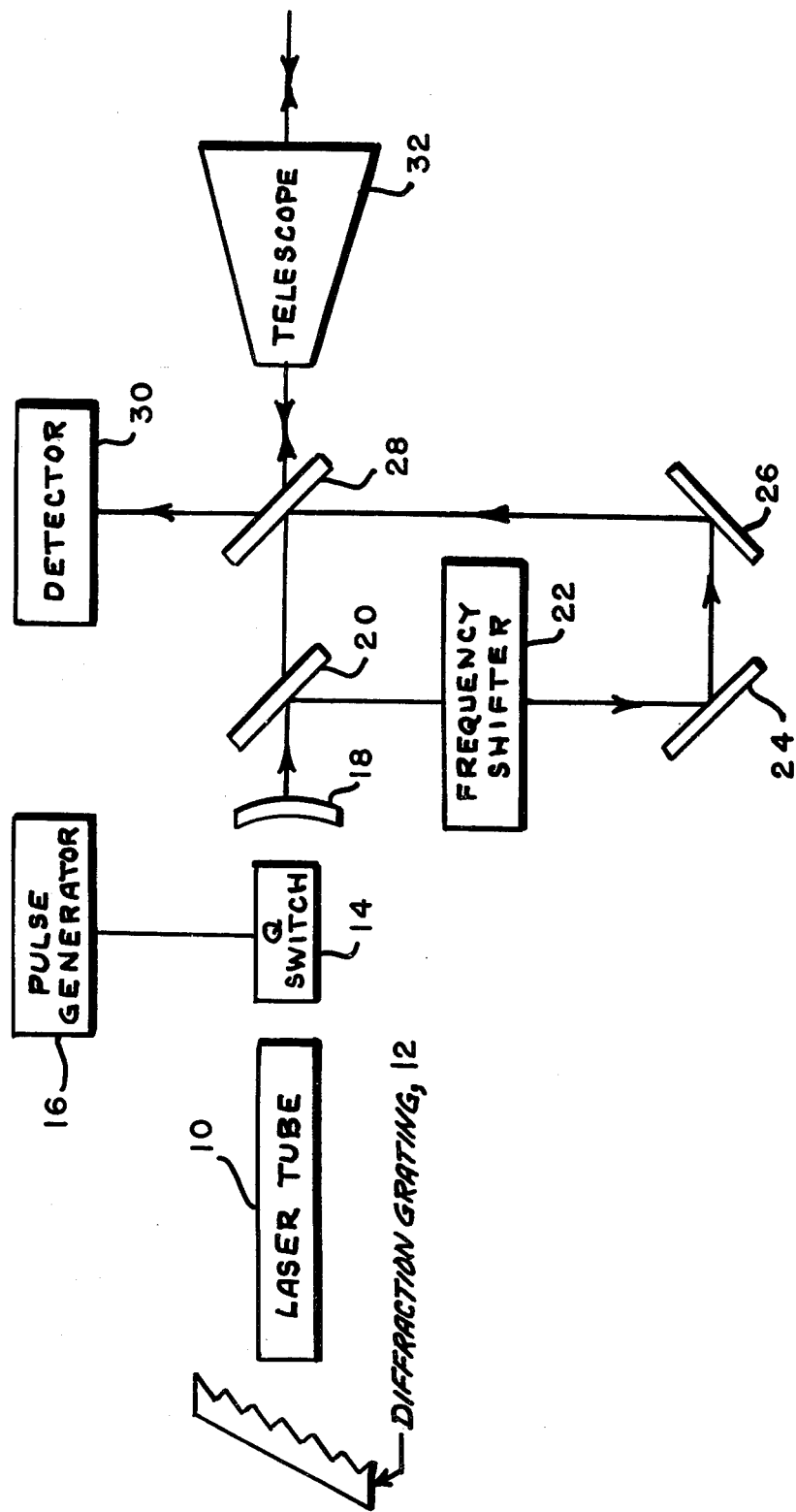
FIG. 1 is a block diagram of a pulsed laser apparatus utilizing heterodyne detection according to the present invention.

Referring now to FIG. 1, there is shown a pulsed laser radar apparatus utilizing heterodyne signal detection. The pulsed laser unit comprises a laser tube 10, a diffraction grating 12, a Q-switch 14 and a pulse generator unit 16. The laser tube 10 which operates in conjunction with the diffraction grating 12 and the Q-switch unit 14, may be any suitable type laser, such as a laser tube containing a $CO_2$ gas mixture. The Q-switch unit 14 is an electro-optical Q-switch, a typical example of which is a cadmium telluride crystal. The diffraction grating 12 may be a blazed diffraction grating which serves as a total reflector in the laser cavity. This type of diffraction grating provides the wavelength selectivity which is utilized in electro-optical Q-switched $CO_2$ laser systems. A high voltage pulse generator unit 16 is utilized to provide the voltage switching pulses to the Q-switch unit 14 which in turn controls the shape and length of the laser output signal.

A partially transmitting mirror 18 is utilized to couple the laser signal to the beam splitter 20. The partially transmitting mirror 18 may be any suitable type mirror such as a zinc selenide mirror. The beam splitter 20 which may also be of the zinc selenide type, is utilized to split off a portion of the transmitted laser signal that may be utilized as a local oscillator signal to the frequency shifter unit 22. The frequency shifter unit 22 comprises acoustic-optic frequency shifter such as a germanium crystal to provide a frequency offset between the local oscillator signal and the returning target laser beam signals. A frequency shifter unit would not be required if either the radar or the target is moving. The local oscillator signal from the phase shifter unit 22 is reflected by totally reflecting mirrors 24, 26, through the beam combiner 28 to the heterodyne detector unit 30. The laser signal passes through the beam combiner 28 to the telescope unit 32 which is utilized to increase the light-gathering power and the resolution of the radar unit. The beam combiner 28 may typically comprise zinc selenide coated mirror. The laser beam passes through the telescope unit 32 to the target and is returned in the manner as shown by the directional arrows which represent the laser beam. The returning target laser beam signal is reflected by the beam combiner unit 28 and combined with the local oscillator signal. The combined laser signal from the beam splitter unit 28 is applied to the heterodyne detector unit 30 wherein the target signal is detected. The heterodyne detector unit may typically comprise a coated mercury cadmium telluride crystal.

Figure 2A:
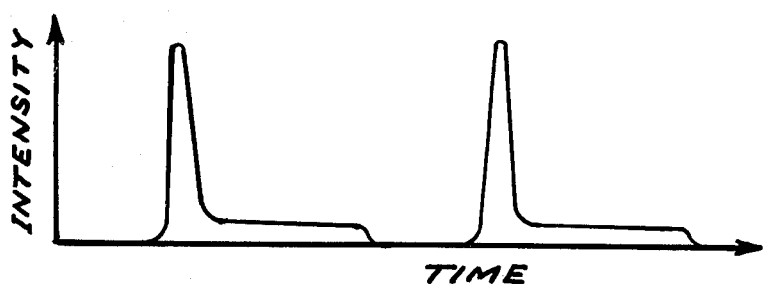
FIGS. 2a and 2b are graphical representations respectively of the laser output waveform and the Q-switch voltage waveform associated with the pulsed laser apparatus; and, FIGS. 3a and 3b are graphically representations of alternative Q-switch voltage waveforms for the pulsed laser apparatus.
Figure 2B:
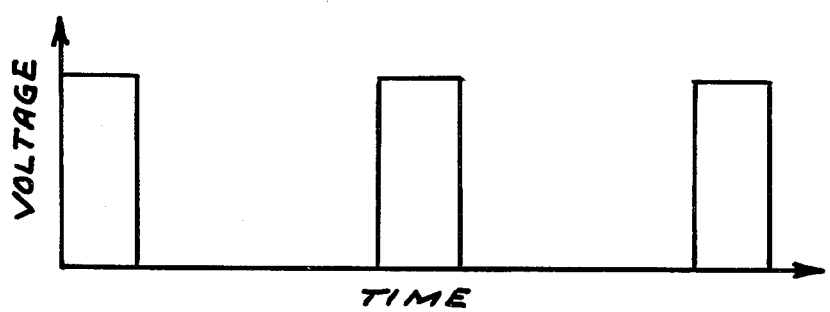
Figure 3A:
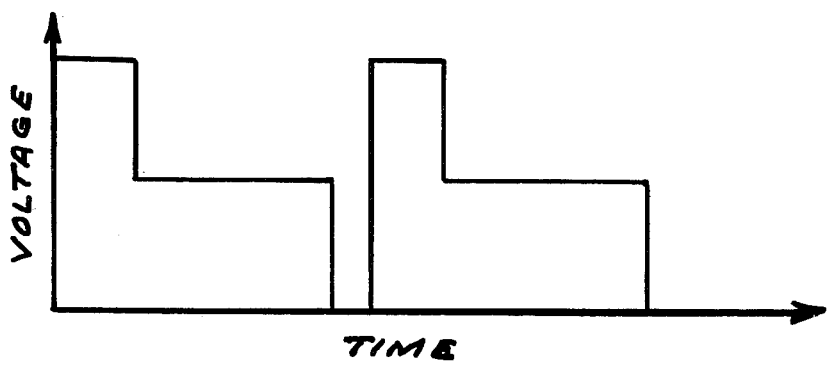
Figure 3B:
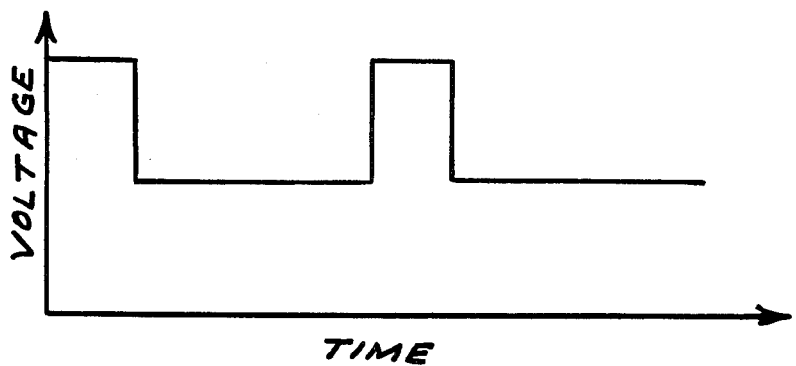

Turning now to FIG. 2a, there is shown a graphical representation of the laser beam output signal. The laser beam comprises a high intensity pulse with a relatively low intensity tail portion that extends for substantially the entire period between pulses. There is shown in FIG. 2b the voltage waveform which is produced by the pulse generator unit and is applied to the Q-switch unit to generate the output waveform that is shown in FIG. 2a. A small portion of the laser beam output is split off from the transmitted beam and is directed to a heterodyne detector to serve as the local oscillator. This, would drain power from the transmitter and may potentially be a considerable amount. However, when the waveforms of FIGS. 2a,b are used, the fraction of the average output signal that is devoted to the local oscillator signal is approximately the fraction of time for which the laser is operating continuous wave. For instance, if in FIG. 2a the interpulse time is 40 usec and the length of the continuous wave tail is 30 usec, which is roughly three quarters of the average laser power that is devoted to the local oscillator. Since the local oscillator power is generally required for only a small fraction of the transmitter power duration it may be greatly reduced by using the waveform of FIG. 3a. Instead of maintaining the voltage on the Q-switch crystal at zero during continuous wave operation, it is raised to a value for which the laser gain is barely above threshold. The output power, and therefore the extraction of stored energy, may be kept at minimal values. If the continuous wave energy extraction is low enough, the laser may not have to be shut off between pulses, and therefore the simpler waveform of FIG. 3b may be utilized. If this mode of operation can be achieved dependably while providing sufficient local oscillator power, there will be no dead time between pulses when the receiver is inoperative. The average output power of the transmitter would then be close to what it would be for a comparable continuous wave laser except for the losses associated with collisional de-excitation between pulses.

In addition to the considerable system simplifications which this scheme allows, such as no separate local oscillator and no control loop for maintaining a constant difference frequency ($\Delta f$) between the transmitter and the local oscillator, the stability requirements of the laser unit are greatly increased. With the present pulsed laser radar apparatus, the frequency jitter must be kept within limits only for the round trip transit time of the pulse which is typically approximately 30 usec for a range of 5 km. With a pulsed system, the laser stability is required to be maintained over the time constant of the $\Delta f$ loop, which is generally a much longer time.

Although the invention has been described with reference to a particular embodiment, it will be understood to those skilled in the art that the invention is capable of a variety of alternative embodiments within the spirit and scope of the appended claims.

What is claimed is:

1. A pulsed laser radar apparatus comprising in combination:
   a Q-switched pulsed laser beam unit to generate a laser pulse signal, said laser pulse signal comprising a high intensity laser pulse with a substantially lower intensity CW trailing tail portion,
   a local oscillator forming means receiving said laser pulse signal, said local oscillator forming means utilizing said trailing tail portion of said laser pulse signal to generate a local oscillator signal,
   a signal resolution means receiving said laser pulse signal which was generated in said Q-switched pulse laser beam unit, said signal resolution means transmitting said laser pulse signal to a target, said signal resolution means receiving a target echo signal, said signal resolution means increasing the resolution of both said transmitted laser pulse signal and said target echo signal, said target echo signal being combined with said local oscillator signal to provide a target signal, and
   a signal detecting means receiving said target signal, said signal detecting means comprising a heterodyne detector unit, said signal detecting means detecting said target signal to provide a target return.

2. A pulsed laser radar apparatus utilizing laser operation as described in claim 1 wherein said local oscillator forming means includes a frequency shifter unit to provide a frequency offset between said local oscillator signal and said target echo signal.

3. A pulsed laser radar apparatus utilizing laser operation as described in claim 1 wherein said trailing tail portion of said laser pulse signal extends for substantially the entire time period between adjacent laser pulses.

4. A pulsed laser radar apparatus utilizing laser operation as described in claim 1 wherein said signal resolution means comprises a telescope.

5. A pulsed laser radar apparatus utilizing laser operation as described in claim 1 wherein said heterodyne detector unit comprises a cooled mercury cadmium telluride crystal.

* * * * *